United States Patent
Shimizu et al.

(10) Patent No.: US 9,466,406 B2
(45) Date of Patent: Oct. 11, 2016

(54) COMMUNICATION CABLE

(75) Inventors: Toshiharu Shimizu, Susono (JP);
Taketo Kumada, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/009,611

(22) PCT Filed: Apr. 4, 2012

(86) PCT No.: PCT/JP2012/059261
§ 371 (c)(1),
(2), (4) Date: Oct. 3, 2013

(87) PCT Pub. No.: WO2012/137850
PCT Pub. Date: Oct. 11, 2012

(65) Prior Publication Data
US 2014/0027149 A1 Jan. 30, 2014

(30) Foreign Application Priority Data
Apr. 5, 2011 (JP) .................................. 2011-083926

(51) Int. Cl.
*H01B 11/00* (2006.01)
*H01B 11/18* (2006.01)
*H01B 11/20* (2006.01)

(52) U.S. Cl.
CPC ........... *H01B 11/00* (2013.01); *H01B 11/1808* (2013.01); *H01B 11/20* (2013.01)

(58) Field of Classification Search
CPC .... H01B 11/00; H01B 11/1808; H01B 11/20
USPC ................... 174/102 R, 107, 110 R
See application file for complete search history.

(56) References Cited

U.S. PATENT DOCUMENTS

| 6,064,007 | A  | * | 5/2000  | Bernstein et al. ........ 174/110 R |
| 2003/0207106 | A1 | * | 11/2003 | Nakamura et al. .... 428/355 EN |
| 2006/0054334 | A1 | * | 3/2006  | Vaupotic et al. ............... 174/36 |
| 2010/0206610 | A1 |   | 8/2010  | Yagi |

FOREIGN PATENT DOCUMENTS

| CN | 1812215   | A | 8/2006 |
| CN | 101834026 | A | 9/2010 |
| JP | 4-190511  | A | 7/1992 |

(Continued)

OTHER PUBLICATIONS

Office Action, Issued by the Korean Intellectual Property Office, Dated Oct. 16, 2014, in counterpart Korean Application No. 10-2013-7026286.

(Continued)

*Primary Examiner* — Hoa C Nguyen
*Assistant Examiner* — Amol Patel
(74) *Attorney, Agent, or Firm* — Sughrue Mion, PLLC

(57) ABSTRACT

A communication cable is provided which can suppress the shielding performance thereof.

A communication cable 1 includes one or a plurality of conductors 10, an insulator 20 placed on the conductor 10 to cover it, a shielding layer 30 which is formed on an outer circumference of the insulator 20, an insulating sheath 40 which covers the shielding layer 30 and a biaxially oriented film layer 50 which is provided between the insulator 20 and the sheath 40 so as to cover the outer circumference of the insulator 20.

2 Claims, 3 Drawing Sheets

(56) References Cited

FOREIGN PATENT DOCUMENTS

| | | | |
|---|---|---|---|
| JP | 10-228823 A | | 8/1998 |
| JP | 11042731 A | * | 2/1999 |
| JP | H 1142731 A | | 2/1999 |
| JP | 2001-76550 A | | 3/2001 |
| JP | 2001-229920 A | | 8/2001 |
| JP | 2003217356 A | | 7/2003 |
| JP | 2007-5096 A | | 1/2007 |
| JP | 2009-146704 A | | 7/2009 |
| JP | 2010-186722 A | | 8/2010 |
| JP | 2010186722 A | * | 8/2010 |

OTHER PUBLICATIONS

English Translation of Written Opinion (PCT/ISA/237), dated May 15, 2012, issued by the International Searching Authority in counterpart International Patent Application No. PCT/JP2012/059261.

International Search Report (PCT/ISA/210), dated May 15, 2012, issued by the International Searching Authority in counterpart International Patent Application No. PCT/JP2012/059261.

Written Opinion (PCT/ISA/237), dated May 15, 2012, issued by the International Searching Authority in counterpart International Patent Application No. PCT/JP2012/059261.

Communication issued on Apr. 21, 2015 by the Korean Intellectual Property Office in related Application No. 1020137026286.

Communication issued on May 5, 2015 by the State Intellectual Property Office of the PR of China in related Application No. 201280017519.X.

Office Action dated Jun. 30, 2015, issued by the Japanese Patent Office in counterpart Japanese Patent Application No. 2011-083926.

Office Action dated Oct. 13, 2015, issued by the Japanese Intellectual Property Office in counterpart Japanese Application No. 2011-083926.

Communication issued on Dec. 28, 2015 by the State Intellectual Property Office of the PR of China in Application No. 201280017519.X.

Communication dated Jun. 27, 2016 issued by The State Intellectual Property Office of People's Republic of China in counterpart Chinese Application No. 201280017519.X.

\* cited by examiner

COMMUNICATION CABLE

TECHNICAL FIELD

The present invention relates to a communication cable.

BACKGROUND ART

Conventionally, various types of shielded wires and coaxial cables have been proposed (for example, refer to Patent Literatures 1, 2). A conventional electric wire includes an insulation layer provided on a conductor and a shielding layer formed on the insulation layer, and these insulation and shielding layers are covered by a sheath. According to this configuration, when noise is emitted to the electric wire from the outside thereof, the noise is interrupted by the shielding layer. Because of this, in this electric wire, it is difficult for noise to be superimposed on data which is transmitted through the conductor.

RELATED ART LITERATURE

Patent Literature

Patent Literature 1: JP-A-2010-186722
Patent Literature 2: JP-A-2009-146704

SUMMARY OF THE INVENTION

Problem that the Invention is to Solve

In many conventional electric wires like the one described above, however, a plasticizer is used in the sheath, and there may be caused a situation in which the plasticizer is volatized under high-temperature environments and then moves to an insulator inside the shielding layer. In the event that the plasticizer moves to the insulator, the inductivity of the insulator is increased to thereby reduce the shielding performance of the electric wire.

The invention has been made with a view to solving the problem described above, and an object thereof is to provide a communication cable which can suppress the reduction in shielding performance thereof.

Means for Solving the Problem

According to one aspect of the invention, there is provided a communication cable including: one or a plurality of conductors; an insulator which covers the conductor; a shielding layer formed on an outer circumference of the insulator; an insulating sheath which covers the shielding layer; and a biaxially oriented film layer which is provided between the insulator and the sheath so as to cover the outer circumference of the insulator.

The communication cable of the invention includes the biaxially oriented film layer which is provided between the insulator and the sheath so as to cover the outer circumference of the insulator. According to the structure, even though the communication cable is exposed to high-temperature environments, causing a plasticizer in the sheath to be volatized, it becomes difficult that the volatized plasticizer moves to the insulator because the plasticizer is interrupted by the film layer. Consequently, it becomes difficult that the inductivity of the insulator is increased. As a result, according to the communication cable of the invention, it is possible to suppress the shielding performance thereof.

Further, since the film layer is biaxially oriented, the film layer is strong in the vertical direction and the horizontal direction. Due to this, even though the communication cable is laid out in a bent fashion, the film layer is made difficult to fail. As a result, according to the communication cable of the invention, it is possible to suppress the reduction in shielding performance no matter how the communication cable is laid out.

In the communication cable of the invention, it is preferable that the film layer is provided between the sheath and the shielding layer.

In this communication cable, the film layer is provided between the sheath and the shielding layer. Here, in case the film layer is interposed between the shielding layer and the insulator, there are fears that the electrostatic capacities and characteristic impedances of the conductor and the shielding layer are affected more or less. In contrast with this, by providing the film layer between the sheath and the shielding layer, it is possible to prevent the occurrence of the aforesaid situation, thereby making it possible to suppress the reduction in shielding performance further.

Advantage of the Invention

According to the invention, it is possible to provide the communication cable which can suppress the reduction in shielding performance thereof.

MODE FOR CARRYING OUT THE INVENTION

Figure 1A:
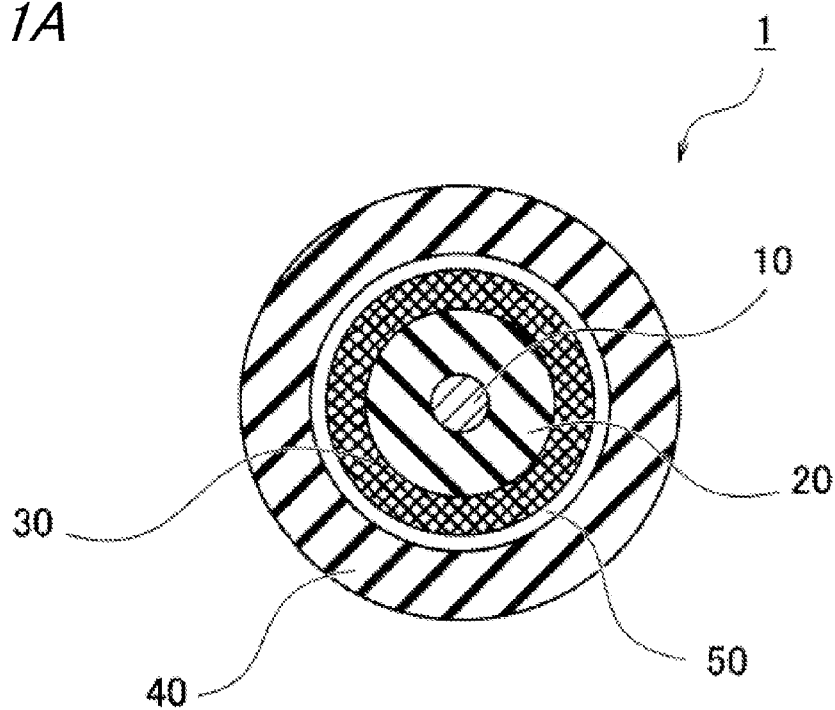
FIGS. 1A and 1B are diagrams showing a communication cable according to an embodiment of the invention shown, FIG. 1A being a sectional view, FIG. 1B being a side view.
Figure 1B:
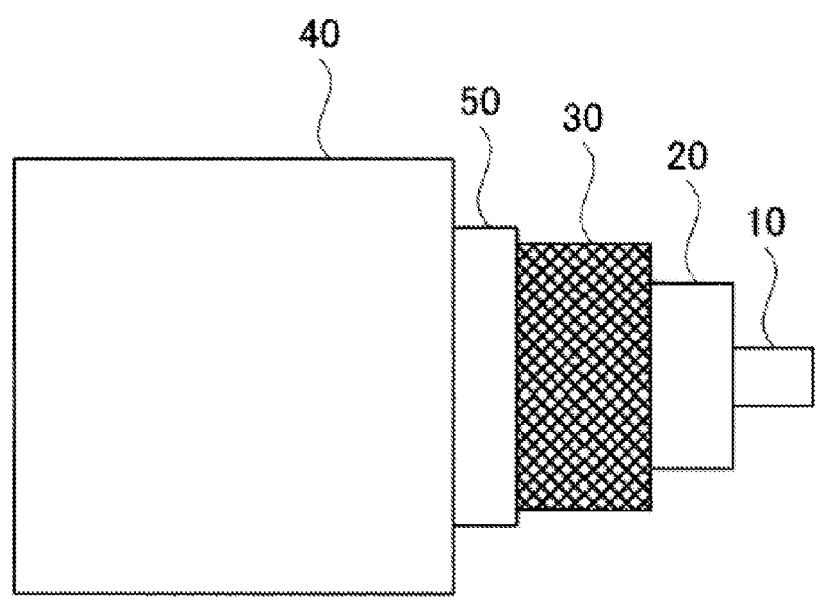

Hereinafter, a preferred embodiment of the invention will be described based on the drawings. FIGS. 1A and 1B are diagrams showing a communication cable according to an embodiment of the invention, and FIG. 1A is a sectional view and FIG. 1B is a side view thereof. As shown in FIGS. 1A and 1B, the communication cable 1 includes a single conductor 10, an insulator 20 which is placed on the conductor 10 so as to cover it, and a shielding layer 30 which is provided around an outer circumference of the insulator 20.

For example, a soft copper wire, a silver plated soft copper wire, a tin plated soft copper wire and a tin plated copper alloy wire are used as the conductor 10. In this embodiment, while the single conductor 10 is used, as will be described later, two or more conductors may be used.

The insulator 20 is a member that is placed on the conductor 10 so as to cover it. For example, PE (polyethylene) or PP (polypropylene) is used as the insulator 20. This insulator 20 has an inductivity of 3.0 F/m or less.

Conductor wires such as copper wires are tied up into a plurality of bundles, and these bundles of conductor wires are then braided together so as to form the shielding layer 30. The sheath 40 is an insulator which covers an outer circumference of the shielding layer 30.

Since the communication cable 1 has the configuration that has been described above, when noise is emitted to the communication cable 1 from an outside thereof, the noise is interrupted by the shielding layer 30. This makes it difficult for noise to be superimposed on data transmitted through the conductor 10.

When used in a motor vehicle, for example, the communication cable 1 is easy to be exposed to high-temperature environments. Under these high-temperature environments, there may be caused a situation in which a plasticizer added to the sheath 40 is volatized and then moves to the insulator 20, which is disposed inside the shielding layer 30. In the event that the plasticizer moves to the insulator 20, the inductivity of the insulator 20 is increased, as a result of which a quantity of noise which is attenuated is reduced, leading to fears that the shielding performance of the communication cable 1 is reduced.

More specifically, the movement of the plasticizer to the insulator 20 increases the inductivity and dielectric loss tangent of the insulator 20. The extent to which the plasticizer moves to the insulator 20 differs from location to location on the insulator 20. As a result, the impedance is disturbed largely, which decreases the quantity of noise to be attenuated largely. In addition, the reduction in quantity of noise to be attenuated increases as the frequency of the noise emitted increases.

Then, the communication cable 1 of this embodiment includes further a film layer 50 in addition to the configuration described above. The film layer 50 is a sheet-like member which is interposed between the sheath 40 and the insulator 20. The film layer 50 is made from PET (polyethylene terephthalate) and has a sufficient density to prevent the intrusion of the plasticizer. It is noted that the film layer 50 may be made from a fluorine plastic.

In the communication cable 1 which is configured in the way described above, even though the plasticizer added to the sheath 40 is volatized under high-temperature environments, the volatized plasticizer is interrupted by the film layer 50, and therefore, it is difficult for the plasticizer to reach the insulator 20. This suppresses the reduction in quantity of noise to be attenuated.

It is noted that in this embodiment, the film layer 50 is a biaxially oriented film layer which is formed by stretching a thermoplastic film biaxially, that is, vertically and horizontally under a high-temperature environment. This increases the strength of the film layer 50 in a vertical direction and a horizontal direction. Consequently, when the communication cable 1 is laid in a bent fashion, the film layer 50 is made difficult to fail. This suppresses the reduction in quantity of noise to be attenuated no matter how the communication cable 1 may be laid out.

Further, as shown in FIG. 1, it is preferable that the film layer 50 is interposed between the sheath 40 and the shielding layer 30. When the film layer 50 is interposed between the shielding layer 30 and the insulator 20, there are fears that the electrostatic capacity and characteristic impedance of the communication cable 1 are affected more or less. In the event that the electrostatic capacity and characteristic impedance change, the inductivity is changed, which changes the quantity of noise to be attenuated. In contrast to this, when the film layer is interposed between the sheath 40 and the shielding layer 30, the occurrence of the aforesaid situation is prevented, whereby the reduction in shielding performance is suppressed. In addition, it is desirable that the film layer 50 has a thickness of 4 μm or more. This prevents the occurrence of a reduction in quantity of noise to be attenuated which would otherwise be caused by a pinhole failure produced in the film layer 50.

Figure 2:
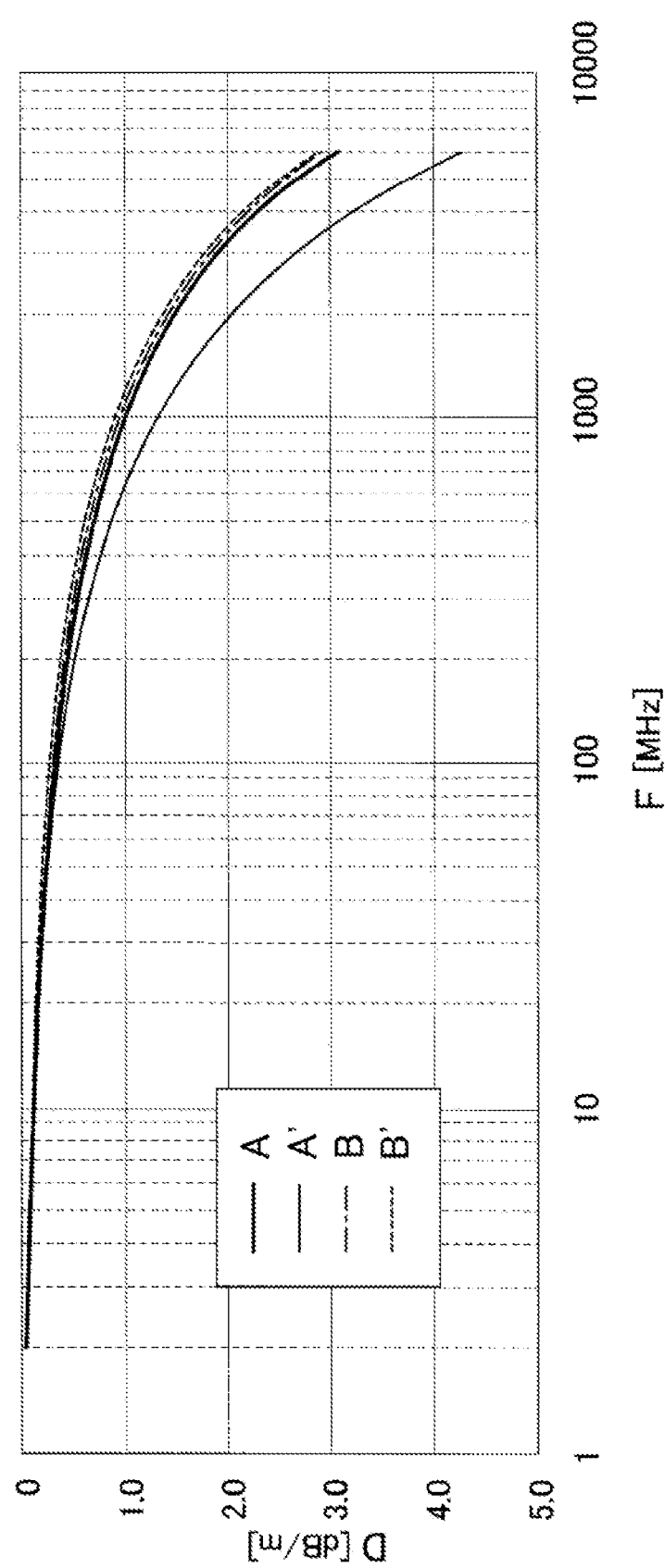
FIG. 2 is a graph showing attenuation characteristics of the communication cable of the embodiment.

Next, the attenuation characteristics of the communication cable 1 according to this embodiment will be described by comparing noise attenuation quantities of the embodiment and a comparison example. FIG. 2 is a graph illustrating the attenuation characteristics of the communication cable 1 of this embodiment.

Firstly, the conductor 10 employed a tin plated soft copper twisted cable having an outside diameter of 0.54 mm and made up of 7/0.18: number of strands/diameter in mm. In addition, the insulator 20 employed a crosslinked PE having a thickness of 0.53 mm and an outside diameter of 1.6 mm. The shielding layer 30 employed a tin plated soft copper wire braid having an outside diameter of about 2.2 mm and made up of 0.10/5/16: number of strands in unit/number of units to be braided/diameter in mm. The sheath 40 employed a heat-resistant PVC (polyvinyl chloride) having a thickness of about 0.45 mm and an outside diameter of 3.1±0.1 mm. Further, the film layer 50 employed a PET film and is interposed between the shielding layer 30 and the insulator 20.

On the other hand, the communication cable according to the comparison example employed the same conductor and insulator as those of the embodiment and employed a tin plated soft copper wire braid having an outside diameter of about 2.1 mm and made up of 0.10/5/16: number of strands in unit/number of units to be braided/diameter in mm. A sheath 40 employed a heat-resistant PVC having a thickness of about 0.5 mm and an outside diameter of 3.1±0.2 mm.

Noise attenuation quantities of both the cables were compared which resulted before and after they had been exposed to an atmosphere of 105° C. for 168 hours. In the graph shown in FIG. 2, an axis of abscissas represents frequency F[MHz], and an axis of ordinates represents noise attenuation quantity D[dB/m]. In addition, reference character A denotes the comparison example, reference character A' denotes the comparison example which was exposed to the atmosphere of 105° C. for 168 hours, reference character B denotes the embodiment, and reference character B' denotes the embodiment which was exposed to 105° C. for 168 hours. As shown in FIG. 2, in the communication cable 1 according to the embodiment, the noise attenuation quantities thereof before it was exposed to the atmosphere of 105° C. for 168 hours were 0.86 dB/m at 900 MHz, 1.15 dB/m at 1500 MHz, and 1.21 dB/m at 1600 MHz. In addition, the noise attenuation quantities were 1.34 dB/m at 1900 MHz, 1.39 dB/m at 2000 MHz, and 1.60 dB/m at 2500 MHz. Further, the noise attenuation quantities were 1.64 dB/m at 2600 MHz and 1.78 dB/m at 3000 MHz.

In contrast with this, the noise attenuation quantities of the communication cable 1 according to the embodiment after it was exposed to the atmosphere of 105° C. for 168 hours were 0.84 dB/m at 900 MHz, 1.14 dB/m at 1500 MHz, and 1.19 dB/m at 1600 MHz. In addition, the noise attenuation quantities were 1.33 dB/m at 1900 MHz, 1.37 dB/m at 2000 MHz, and 1.60 dB/m at 2500 MHz. Further, the noise attenuation quantities were 1.63 dB/m at 2600 MHz and 1.79 dB/m at 3000 MHz.

In this way, in the communication cable 1 according to this embodiment, there was almost no change in noise attenuation quantity even when the communication cable 1 was exposed to the high-temperature environment for the long period of time.

In the communication cable according to the comparison example, the noise attenuation quantities before it was exposed to the atmosphere of 105° C. for 168 hours were 0.92 dB/m at 900 MHz, and 1.23 dB/m at 1500 MHz, 1.29 dB/m at 1600 MHz. In addition, the noise attenuation quantities were 1.43 dB/m at 1900 MHz, 1.48 dB/m at 2000

MHz, and 1.71 dB/m at 2500 MHz. Further, the noise attenuation quantities were 1.75 dB/m at 2600 MHz and 1.90 dB/m at 3000 MHz.

In contrast with this, the noise attenuation quantities of the communication cable according to the embodiment after it was exposed to the atmosphere of 105° C. for 168 hours were 1.24 dB/m at 900 MHz, 1.70 dB/m at 1500 MHz, and 1.78 dB/m at 1600 MHz. In addition, the noise attenuation quantities were 2.00 dB/m at 1900 MHz, 2.06 dB/m at 2000 MHz, and 2.41 dB/m at 2500 MHz. Further, the noise attenuation quantities were 2.46 dB/m at 2600 MHz and 2.69 dB/m at 3000 MHz.

In this way, in the communication cable according to the comparison example, the noise attenuation quantity was largely reduced when the cable was exposed to the high-temperature environment for the long period of time.

It has been found from the comparison between the embodiment and the comparison example that the communication cable 1 according to the embodiment in which the movement of the plasticizer is prevented by the film layer 50 is superior in noise attenuation characteristics to the communication cable of the comparison example.

In this way, the communication cable 1 according to this embodiment includes the biaxially oriented film layer 50 which is interposed between the insulator 20 and the sheath 40 so as to cover the outer circumference of the insulator 20. By the provision of the film layer 50 in that way, even though the communication cable 1 is exposed to the high-temperature environments, causing the plasticizer in the sheath 40 to be volatized, the volatized plasticizer is interrupted by the film layer 50, this making it difficult for the plasticizer to move to the insulator 20. Consequently, it is difficult for the inductivity of the insulator 20 to be increased. As a result, according to the communication cable 1 of the embodiment, it is possible to suppress the reduction in shielding performance thereof. In addition, not only the plasticizer from the sheath 40 but also plasticizers from other members located near the communication cable 1 can also be prevented from moving to the insulator 20 in a similar way while the communication cable 1 is in use, whereby it is possible to suppress the reduction in shielding performance thereof.

Further, since the film layer 50 is biaxially oriented, the film layer 50 is strong in the vertical direction and the horizontal direction. By this characteristic of the film layer 50, even though the communication cable 1 is laid out in a bent fashion, the film layer 50 is made difficult to fail. As a result, according to the communication cable of the invention, the reduction in shielding performance can be suppressed no matter how the communication cable 1 is laid out.

In addition, in the communication cable 1 according to this embodiment, the film layer 50 is provided between the sheath 40 and the shielding layer 30. Here, in case the film layer 50 is interposed between the shielding layer 30 and the insulator 20, there are fears that the electrostatic capacities and characteristic impedances of the conductor 10 and the shielding layer 30 are affected more or less. In contrast with this, by providing the film layer 50 between the sheath 40 and the insulating layer 30, the reduction in noise attenuation quantity can be suppressed further.

Thus, while the invention has been described based on the embodiment, the invention is not limited to the embodiment, and hence may be modified without departing from the spirit and scope of the invention.

Figure 3:
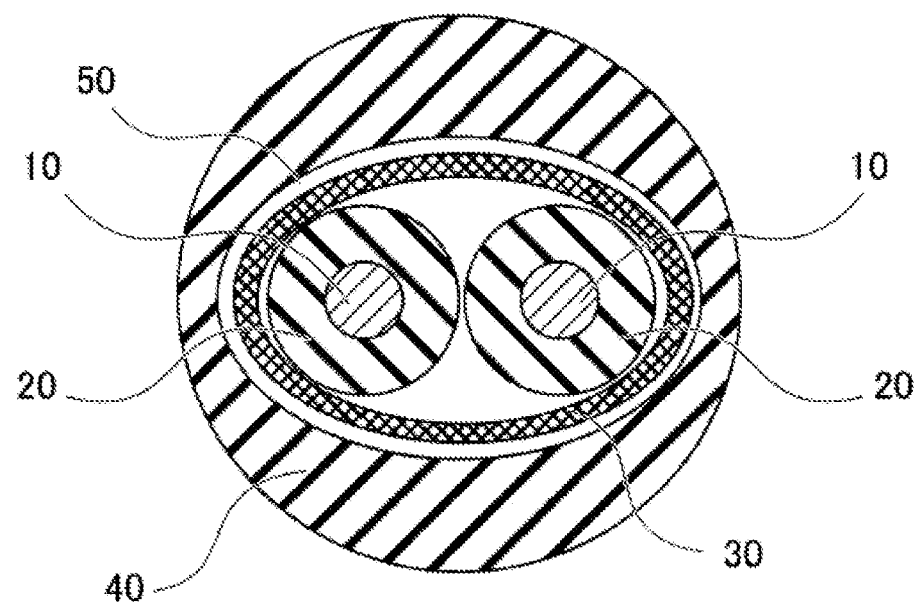
FIG. 3 is a sectional view showing a modified example of a communication cable according to the embodiment.

For example, while the communication cable 1 according to the embodiment is made up of the single conductor 10, the communication cable 1 may be configured as shown in FIG. 3. FIG. 3 is a sectional view showing a modified example of a communication cable 1 according to the embodiment.

As shown in FIG. 3, a communication cable 1 according to the modified example, includes two conductors 10 and insulators 20 which cover individually the two conductors 10, and the conductors and the insulators are covered altogether by a shielding layer 30. In addition, the communication cable 1 is not limited to the modified example shown in FIG. 3 and hence, may be made up of three or more conductors 10. In addition, the conductor 10 may be made up of twisted wires.

Further, while the communication cable 1 shown in FIG. 1 is such that the film layer 50 is provided between the shielding layer 30 and the sheath 40, the invention is not limited thereto, and hence, the film layer 50 may be provided between the insulator 20 and the shielding layer 30. Even though this configuration is adopted, the reduction in shielding performance is also suppressed.

While the invention has been described in detail and by reference to the specific embodiment, it is obvious to those skilled in the art to which the invention pertains that various alterations and/or modifications can be made thereto without departing from the spirit and scope of the invention.

This patent application is based on Japanese Patent Application (No. 2011-83926) filed on Apr. 5, 2011, the contents of which are incorporated herein by reference.

INDUSTRIAL APPLICABILITY OF THE INVENTION

The invention is useful in providing the communication cable which can suppress the reduction in shielding performance thereof.

DESCRIPTION OF REFERENCE NUMERALS

1: communication cable; 10: conductor; 20: insulator; 30: shielding layer; 40: sheath; 50: film layer.

The invention claimed is:

1. A communication cable comprising:
   one or a plurality of conductors;
   an insulator which covers the conductor;
   a shielding layer formed on an outer circumference of the insulator;
   an insulating sheath which covers the shielding layer; and
   a biaxially oriented film layer which is provided between the insulator and the sheath so as to cover the outer circumference of the insulator,
   wherein the biaxially oriented film layer has a thickness smaller than a thickness of the shielding layer and a thickness of the insulating sheath, and the thickness of the biaxially oriented film layer is configured to prevent intrusion of plasticizer present in the sheath into the insulator, and the thickness of the biaxially oriented film layer is equal to or larger than 4 μm,
   wherein the biaxially oriented film layer is in contact with the shielding layer.

2. The communication cable according to claim 1, wherein
   the film layer is provided between the sheath and the shielding layer.

* * * * *